United States Patent
Misikangas

(10) Patent No.: US 7,149,531 B2
(45) Date of Patent: Dec. 12, 2006

(54) LOCATION APPLICATIONS FOR WIRELESS NETWORKS

(75) Inventor: Pauli Misikangas, Helsinki (FI)

(73) Assignee: Ekahau Oy, Helsinki (FI)

( * ) Notice: Subject to any disclaimer, the term of this patent is extended or adjusted under 35 U.S.C. 154(b) by 541 days.

(21) Appl. No.: 10/365,621

(22) Filed: Feb. 13, 2003

(65) Prior Publication Data

US 2004/0176108 A1 Sep. 9, 2004

(51) Int. Cl.
*H04Q 7/20* (2006.01)
*H04B 17/00* (2006.01)
*H04B 7/00* (2006.01)

(52) U.S. Cl. .............. 455/456.1; 455/456.5; 455/456.6; 455/67.11; 455/517

(58) Field of Classification Search ............. 455/456.1, 455/456.2, 456.5, 456.6, 67.11, 517
See application file for complete search history.

(56) References Cited

U.S. PATENT DOCUMENTS

| | | | |
|---|---|---|---|
| 6,112,095 A | 8/2000 | Wax et al. | |
| 6,263,208 B1 | 7/2001 | Chang et al. | |
| 6,266,014 B1 | 7/2001 | Fattouche et al. | |
| 6,269,246 B1 | 7/2001 | Rao et al. | |
| 6,393,294 B1 | 5/2002 | Perez-Breva et al. | |
| 6,782,265 B1 | 8/2004 | Perez-Breva et al. | |
| 2001/0028313 A1 | 10/2001 | McDonnell et al. | |
| 2002/0009975 A1* | 1/2002 | Janusz et al. | .............. 455/73 |
| 2004/0166809 A1* | 8/2004 | Dickey | ............. 455/67.11 |

FOREIGN PATENT DOCUMENTS

WO   WO 02/054813 A1   7/2002

* cited by examiner

*Primary Examiner*—George Eng
*Assistant Examiner*—Un C. Cho
(74) *Attorney, Agent, or Firm*—Pillsbury Winthrop Shaw Pittman LLP

(57) ABSTRACT

A method for locating terminals in a wireless network including several base stations. A probabilistic model of the wireless network indicates a probability distribution for signal values of several base stations at several locations in the wireless network. Each terminal makes a set of observations of signal values of a subset of the several base stations. The terminal's location is estimated based on the probabilistic model (PM) and the set of observations. The terminal recurrently measures at least one additional item, which is not used for locating the terminal. Each information tuple indicates the additional items and the time and the location at which the additional items were measured. The information tuples are used to determine the additional item as a function of time and location in the wireless network.

14 Claims, 2 Drawing Sheets

LOCATION APPLICATIONS FOR WIRELESS NETWORKS

BACKGROUND OF THE INVENTION

The invention relates to location applications for wireless networks, particularly to site survey techniques for wireless networks.

Wireless networks have become increasingly popular as network services are not tied to a specific connection point. It has recently been discovered that observations of a signal quality value in a wireless network, such as signal strength, bit error rate/ratio, signal-to-noise ratio, and the like, can be used to locate a mobile communication device. In the context of the present invention, the term 'terminal' refers to a mobile communication device whose location is to be determined.

FIG. 1 schematically illustrates an example of such a positioning technique. A terminal T communicates via base stations BS via a radio interface RI. In this example, the communication is assumed to be radio communication. The terminal T observes signal values at the radio interface RI. Observations O are applied to a probabilistic model PM that models the terminal's wireless communication environment and produces a location estimate LE. As used herein, a terminal is a device whose location is to be determined. The terminal communicates via signals in a wireless network, and signal values in the wireless network are used for determining the terminal's location. For example, the terminal may be a data processing device communicating in a wireless local-area network (WLAN). The data processing device may be a general-purpose laptop or palmtop computer or a communication device, or it may be a dedicated test or measurement apparatus such as a hospital instrument connected to the WLAN. A location, as used herein, is a coordinate set comprising one to three coordinates. In some special cases, such as tunnels, a single coordinate may be sufficient but in most cases the location is expressed by a coordinate pair (x, y or angle/radius).

Mobile communication devices measure signal quality parameters. A good example of a signal quality parameter is signal strength. An acronym RSSI is frequently used to refer to a received signal strength indicator. The RSSI is used, for example, to select a cell or base station.

When a wireless network is set up, it is recommended to carry out a site survey in which such signal quality parameters are determined at various locations to ensure that the wireless network provides adequate coverage. In a normal site survey, the locations in which the measurements are made are known by other means, such as from a floor plan or other map.

A problem underlying the present invention is related to the fact that carrying out the site survey and setting up the probabilistic model are expensive processes.

A site survey means observing some quality parameter of a wireless network. Similar problems exist in observing parameters that are not directly coupled to the wireless network, such as measuring an environmental variable such that the wireless network is used for location estimation and for communicating measurement results, without the network itself being measured. A problem in prior art site survey and other measurement techniques in wireless networks is that they are labour intensive and/or produce inadequate information.

BRIEF DESCRIPTION OF THE INVENTION

An object of the present invention is to provide a method and equipment that helps to improve the known site survey and other measurement techniques in wireless networks. The object of the invention is achieved by the methods and equipment which are characterized by what is stated in the independent claims. Preferred embodiments of the invention are disclosed in the dependent claims.

An aspect of the invention is a method for locating several terminals in a wireless network comprising several base stations. The method comprises the steps of:
  maintaining a probabilistic model of the wireless network, the probabilistic model indicating a probability distribution for signal values of several base stations at several locations in the wireless network;
  for each of the several terminals:
  the terminal making a set of observations of signal values of a subset of said several base stations;
  determining an estimate of the terminal's location based on the probabilistic model and the set of observations;
  the terminal recurrently measuring at least one additional item, wherein the at least one additional item is not used for determining the estimate of the terminal's location;
  collecting information tuples, wherein each information tuple indicates the at least one additional item and the time and the estimate of the terminal's location at which the at least one additional item was measured;
  storing and organizing the information tuples;
  using the stored information tuples to determine the at least one additional item as a function of time and location in the wireless network.

Another aspect of the invention is an arrangement for carrying out this method. The arrangement comprises means for measuring at least one additional item at the terminal's location, wherein the at least one additional item is not comprised in said set of observations. The measuring means depend on the nature of the additional item(s) being measured. If the additional item is the signal strength of base stations that are not being used to locate the terminal, or network throughput, no additional hardware is required, and the measuring means may comprise only software routines. On the other hand, if the additional item is an environmental variable, additional hardware, such as sensors and analogue-to-digital converters, is usually required. But measuring an environmental variable per se poses no great difficulties to a person with ordinary skill in the art, and a detailed description may be omitted.

A typical example of the wireless network is a WLAN (Wireless Local Area Network) but the invention is applicable in virtually any radio or microwave network comprising multiple base stations.

The expression "measuring at least one additional item which is not used for determining the estimate of the terminal's location" has several implementations. In some embodiments, the additional item may be a signal value of a base station that is not used for locating the terminal when the additional item is measured. The measurements of that base station can be used to update the probabilistic model. This embodiment makes it possible to carry out the site survey and update the probabilistic model in a working wireless network such that the terminals are conventional user terminals. As a result, this embodiment lowers the actual costs caused by the site survey and/or the probabilistic model. A preferred technique for adding new locations (sample points) to a probabilistic model is disclosed in co-assigned Finnish patent application 20021044, filed 31 May 2002, which is incorporated herein by reference.

In other embodiments, the additional item may be a physical quantity that is totally unrelated to the wireless network. For instance, the physical quantity may be an environmental variable such as temperature, acoustic noise, or the like. Measuring a physical quantity unrelated to the wireless network does not lower the actual costs involved in the site survey and/or the probabilistic model but makes it possible to make maximum use of the investments caused by the site survey and/or the probabilistic model. Because the results of the site survey and the probabilistic model can be used for additional purposes, their apparent costs are lowered.

The expression "information tuples that indicate the additional item and the time and the estimate of the terminal's location" has several implementations as well. In some embodiments, the information tuples may comprise the measured signal values on the basis of which the terminal's location is estimated. In other embodiments, the information tuples may comprise the location estimates.

The invention is based on the idea of using a large number of end-user terminals to carry out measurements in the wireless network. The terminals themselves are located based on signal values they observe in the wireless network. The location estimation is based on a probabilistic model that indicates a probability distribution for signal values of several base stations at several locations in the wireless network. In parallel to the locating process, the terminals measure one or more additional items that are not used for locating the terminals. For example, the one or more additional items may comprise network throughput or some variable completely unrelated to the network. Alternatively, the additional item may comprise signal values of base stations that are not (yet) used for locating the terminal. In other words, the terminals may be used to improve the probabilistic model that is used to locate them.

The expression "a large number of end-user terminals" means that conventional terminals of normal network users, instead of terminals of dedicated support personnel, may be used to carry out the measurements. Because normal network users and normal terminals can carry out the measurements, the cost of obtaining measurements is negligible. A technical benefit of the lower costs is that the coverage of measurements can be vastly improved, both spatially and temporally. Thus, a specific value of a "large number" is meaningless, and the essential fact is that because the terminals used for measurements are normal end-user terminals, extensive spatial and temporal coverage is possible with minimal additional expenses.

A particular advantage of the large number of end-user terminals is the fact that throughput measurements are more realistic than those performed by a small number of dedicated measurement terminals.

To express this idea more formally, we have a set of terminal devices $D=\{d_1, d_2, \ldots, d_k\}$. The devices measure a set of physical quantities $V=\{v_1, v_2, \ldots, v_m\}$. Observations of these quantities are denoted by $O=\{o^1, o^2, \ldots, o^m\}$. The probabilistic model comprises a set of sample points $S=\{s_1, s_2, \ldots, s_n\}$, such that each sample point corresponds to a location in an area A covered by the probabilistic model and indicates probability distributions of signal values for some of the quantities in V. In other words, the probabilistic model comprises a subset $V_{PM} \subset V$. (The "$\subset$" symbol means a subset). To observe the additional item(s), such as site survey measurements, there is a set of additional measured quantities $V_{SS}=V\backslash V_{PM}$, which means the set V from which $V_{PM}$ is excluded. (The subscript ss is an acronym of site survey, but the invention is applicable to other types of measurements as well.)

The terminals' observations are assembled as information tuples (t, d, O), wherein t is the time at which the measurement was made, d indicates the terminal and O is the set of observations of variables in V measured by terminal d at time t. An observation subset $O_{PM} \subset O$ contains observations of the variables in $V_{PM}$ used for positioning, and subset $O_{SS}=O\backslash O_{PM}$ contains observations of the variables in $V_{SS}$.

The idea of the invention is to assemble information in order to determine a distribution function g(t, a, v), in which $a \in A$, $v \in V_{SS}$, that returns the value (distribution) of variable v at location a and time t. Depending on the implementation, the various quantities may be interpreted as discrete or continuous.

The additional items that are not used to locate the terminal can be used to update a model of the wireless network as follows. The model to be updated can be the probabilistic model that is used to locate the terminal, or it can be a model of some quantity that will not serve as a basis for location estimation. Preferably, for each physical quantity $V \in V_{SS}$, each of the sample points $s_k$, $s_k \in S$, is associated with a history (set) of prior observations $H^i_k = \{(o^i_{k1}, w^{kl}, t_{kl}), (o^i_{k2}, w_{k2}, t_{k2}), \ldots\}$ wherein $o^i_{kl}$ is the l:th observation of physical quantity $v_i$ at sample point $s_k$. $w_{kl}$ and $t_{kl}$ are, respectively, the weight and time stamp of that observation.

At time t, quantities of $V_{PM}$ and $V_{SS}$ are measured, resulting in observation sets $O_{PM}$ and $O_{SS}$. The terminal measuring the quantities is located on the basis of the probabilistic model and the observations $O_{PM}$ (and preferably also using previous observations measured by the same terminal). As a result of the positioning, each sample point $s_k \in S$ is associated with a probability $p_k$ that is the probability for the sample point $s_k$ being the best location estimate for the terminal at time t. The new observations $O_{SS}$ can be used to update the set of prior observations $H^i_k$ such that the weight of the new observations at any given sample point is the probability of that sample point being the best location estimate for the terminal. (Or at least, the weight of the new observation has a strong correlation with the probability). In other words, for each variable $v_i \in V_{SS}$ and sample point $s_k \in S$, the corresponding set of prior observations $H^i_k$ is supplemented with tuple $(o^i, p_k, t)$, $o^i \in O_{SS}$.

A preferred embodiment of the invention relates to visualizing the measurements in the wireless networks. The visualizing comprises weighting the measurements made at different times with a time-dependent weight function. From the set of prior observations $H^j_k$ at sample point $s_k$, a probability distribution (such as a histogram or the like) of variable $v_j \in V_{SS}$ for a given point in time $t_0$ can be calculated such that more recent observations have stronger weight than older ones. In order to do so, we define a weight function $f(t, t_0)$ that returns the weight of observations made at time t when the moment of interest (such as the present) is time $t_0$. By way of example, such a weight function $f$ can be of the form $f(t, t_0)=\alpha^{51\ t0-t/\beta}$, wherein the parameters $0<\alpha<1$ and $\beta>0$ determine the rate at which the weight of an observation decreases with time. Thus the final weight of observation $o^j_{kl}$ in the distribution is $w_{kl} \cdot f(t_{kl}, t_0)$.

A further preferred embodiment comprises calculating a weighted average age (average distance from the present time $t_0$) of the measurements at each sample point $s_k \in S$ as:

$$t_0 - \left( \sum_i t_{ki} \cdot w_{ki} \cdot f(t_{ki}, t_0) \bigg/ \sum_i w_{ki} \cdot f(t_{ki}, t_0) \right)$$

Such a weighted average age can be used to indicate a need to update the model, ie, a need to perform more measurements at or near that sample point in question. The higher the weighted average age, the greater the need to update the data for the sample point. In a preferred embodiment of the invention, a simultaneous need and opportunity to update the model is detected in response to detecting two simultaneous conditions, namely the weighted average age exceeding a predetermined threshold and the existence of one or more terminals at or near the sample point that needs to be updated.

Based on the coordinates ($x_k$, $y_k$) of sample point $s_k$ and the distributions, the distributions for any location (x, y) can be calculated by interpolation (or extrapolation, in rare cases, with reduced reliability). Thus the measurements can be visualized over the entire area of interest, at any given time. An example of such visualization is a presentation of network throughput as a "film" in which interesting values (poor throughput or the like) are highlighted with a specific colour or intensity. The film indicates network throughput at all areas in the network during the entire period of interest. Such a film gives a good overall view of network performance and helps to locate problematic areas and times.

An additional problem is caused by the fact that many network users and administrators are primarily interested in network throughput at a given location and time, but network throughput experienced by the terminal and the signal values to determine the terminal's location cannot be measured simultaneously. This is because the terminal needs to scan all frequencies to get an overall view of the signals of various base stations, and such scanning naturally interrupts the terminal's ability to communicate, ie, carry out throughput measurements. Accordingly, throughput is preferably measured under common administration, such as controlled by a common controller that synchronizes the location and throughput measurements. Because a principal idea of the invention is to use a large number of normal end-user terminals to carry out measurements, the end users cannot be ordered to move to a certain location and stand still during the throughput measurement. Instead, the controller detects the simultaneous need to update the model at a given location (sample point) and the opportunity to use an end-user terminal that happens to be at or near that location. The terminal's location is determined on the basis of signal value measurements of several base stations (scanning of several frequencies), but this scanning needs to be interrupted for the duration of the throughput measurement. After completion of the throughput measurement, the scanning of several frequencies is resumed, the terminal's new location is estimated, and the weight of the throughput measurement is adjusted according to the distance the terminal moved during the throughput measurement. The controller may employ inverse weighting such that the weight of a throughput measurement and the estimated distance the terminal moved during the throughput measurement correlate negatively. If measurement data is readily available, the controller may simply discard a throughput measurement if the terminal moved more than some predetermined distance during the throughput measurement. In other words, less reliable measurements may be accepted if nothing better is available.

Alternatively, such a lack of reliable information may be indicated to network administrators so that they can bring a terminal to the problematic location for measurements.

In addition, the common administration eliminates a drawback of uncoordinated measurements, namely the fact that simultaneous throughput measurements by several terminals would affect each other.

A physical implementation of the controller may be a dedicated server or a process run in a network administrator's computer.

In some embodiments, the at least one additional item may be the existence of new base stations. Wireless networks are prone to eavesdropping because it is relatively easy to set up new base stations that look like legitimate base stations but are used for eavesdropping. Such activity is sometimes called "spoofing". Thus, a rogue base station advertises its services like a legitimate base station does, offering all the services of a legitimate base station, but users are unaware of the fact that their traffic may be intercepted. In some embodiments of the invention, such rogue base stations can be detected by reporting the existence of base stations and the terminal location to the network operator. The combined information on the terminal locations and the signal strength observations of the rogue base station makes it possible to locate the rogue base station.

The use of normal end-user terminals creates yet another additional problem, because the signal-measurement devices of normal end-user terminals are not calibrated and differ from each other. A solution to this partial problem is based on multiple device models, one of which is selected for each terminal such that the device models compensate for the differences between different terminals' observations. In other words, the selected device model compensates for the differences between a specific terminal's observations and some common reference value.

BRIEF DESCRIPTION OF THE DRAWINGS

In the following, the invention will be described in greater detail by means of preferred embodiments and with reference to the attached drawings, in which FIG. 1 schematically illustrates a positioning technique.

DETAILED DESCRIPTION OF THE INVENTION

Figure 1:
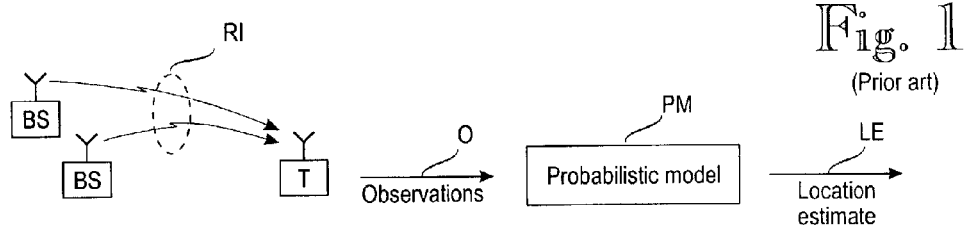
Figure 2:
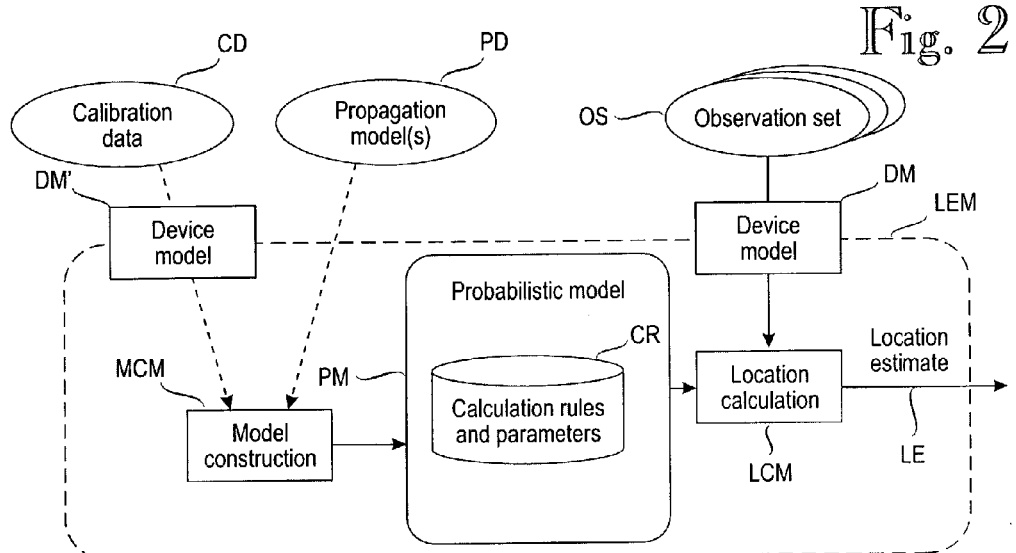
FIG. 2 shows a location estimation module LEM for estimating a terminal's location based on signal values at the radio interface RI.

FIG. 2 is a block diagram of an exemplary location estimation module LEM for estimating a terminal's location based on signal values at a radio interface RI. FIG. 2 shows a compact location estimation module LEM, but more distributed embodiments are equally possible. An essential feature of the location estimation module is a probabilistic model PM of the terminal's wireless network, the probabilistic model being able to predict the terminal's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if not known by other means). Optionally, the calibration data records may also comprise the time at which the observation was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the terminal's observation set OS and the probabilistic model PM. For instance, the location calculation module can be implemented as a software program being executed in a laptop or palmtop computer.

In order to compensate for the differences between different signal quality observations, the terminal's observation set OS is applied to the location estimation module LEM via a device model DM. In practice, there will be many different device models, and an appropriate one will be selected based on some logic, as will be described in more detail later. FIG. 2 shows an embodiment in which the calibration data CD is also applied to the model construction module via a second device model DM'. The second device model DM' is basically similar to the first device model DM and permits input of calibration data CD from different calibration devices. On the other hand, if all calibration data CD is collected with a single calibration device, or with multiple matching calibration devices, the second device model DM' may be superfluous.

Figure 3:
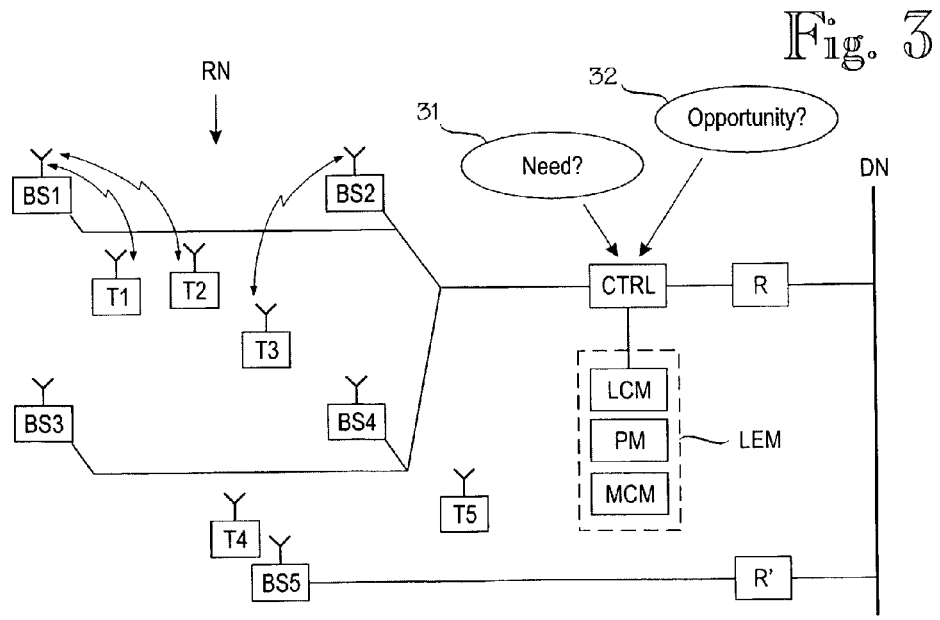
FIG. 3 illustrates an arrangement that comprises a common controller for controlling measurements.

FIG. 3 illustrates an arrangement that comprises a common controller for controlling measurements. Such a common controller is needed for network throughput measurements, for example, because the actions of several terminals must be monitored and/or coordinated. Network throughput is one example of the one or more additional items measured in step 75 of FIG. 7. In the embodiment shown in FIG. 8, the radio network RN comprises a controller CTRL and the radio network RN is connected via a router R to a data network DN, such as the Internet.

As shown by ovals 31 and 32, the controller CTRL detects a simultaneous need and opportunity to measure network throughput. A need 31 to measure the throughput at some location of the network, ie, at or near a location corresponding to a sample point of the probabilistic model. The need to perform such a measurement may be detected as follows. For example, the controller CTRL may keep track of the most recent throughput measurement, and when the most recent throughput measurement is older than a given threshold age, the throughput should be measured again. Additionally, a need to measure throughput may arise if the network structure or capacity has changed or the most recent measurement strongly deviates from previous measurement history. Yet further, the need may be detected as a response to a signal from the network operator. In a preferred embodiment of the invention, throughput and the need and opportunity to measure it are maintained on sample-point-specific basis. After a throughput measurement, the controller CTRL should check that the location of device T1 has remained substantially the same. If not, the weight of the measurement can be reduced, or the measurement can be rejected entirely.

Another example of the additional item is a signal quality parameter of those base stations that are not used for locating the terminal when the additional item is measured. For example, device T3 may be located based on the observed signal strength of base stations BS1 to BS3, and device T3 may measure the signal strength of base station BS4. This information may then be used to update the probabilistic model of the radio network.

Yet another example of the additional item is detection of illegitimate of suspect base stations. For example, assume that base station BS5 is a rogue base station that is used for eavesdropping. It is connected via another router R' to the data network DN. The base station BS5 advertises its services (including broadcasting its base station identifier) like the other base stations BS1 to BS4 do, offering all the normal services of a base station. In order to locate the rogue base station BS5, the controller CTRL commands the terminals that can receive base station BS5 to measure the signal of BS5. Assume that all devices T1 through T5 can receive BS5 but T4 measures the strongest signal from B5. Accordingly, BS5 is assumed to be located near T4.

An even better way to determine the location of BS5 is to use all observations of the signals from BS5 to calculate the location of BS5 by means of an inverse propagation model. Yet another alternative is to visualize the signal strength of BS5 over a map such that a human observer can easily spot likely locations for BS5.

Figure 4:
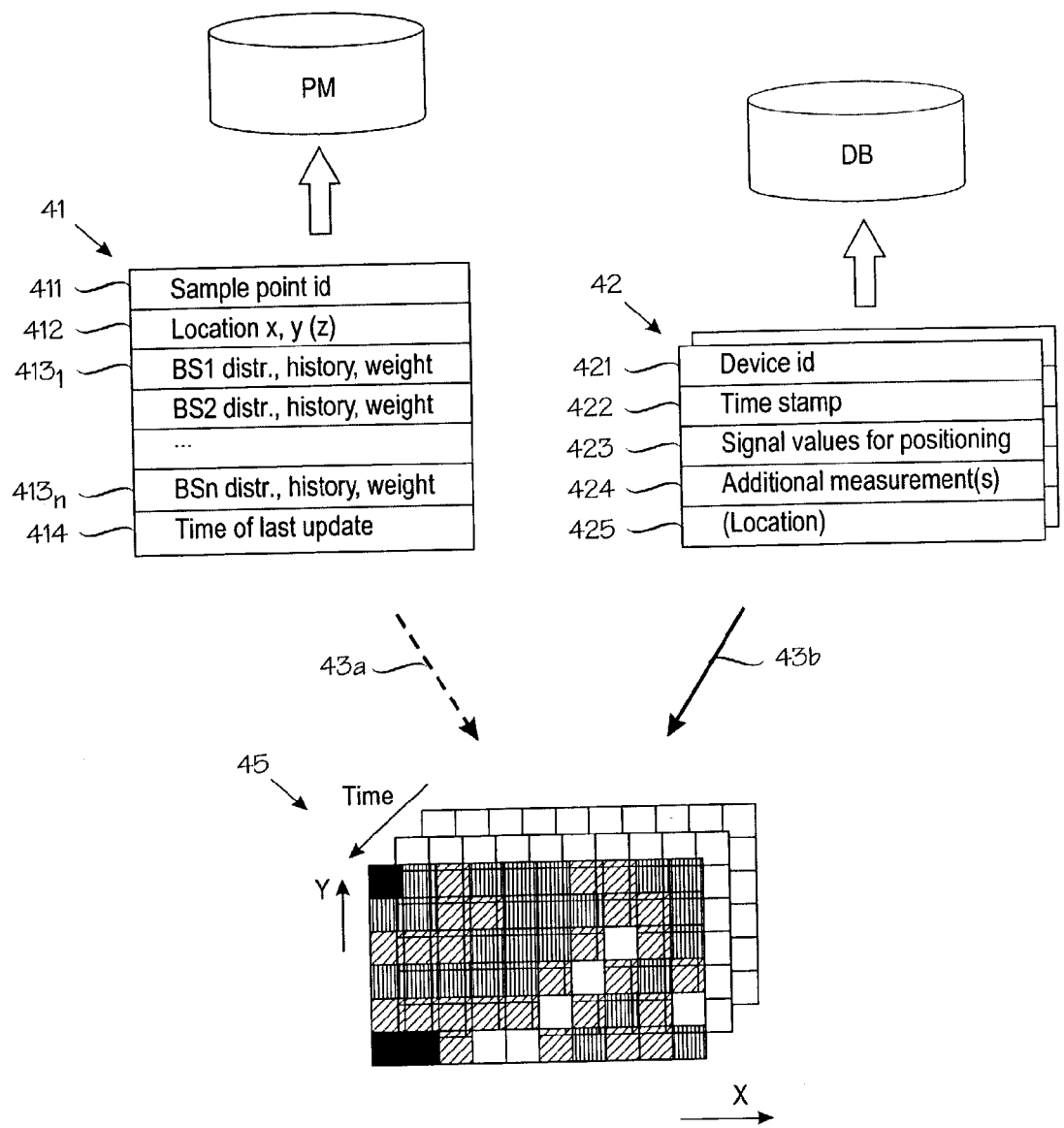
FIG. 4 illustrates various information flows in a preferred embodiment of the invention.

FIG. 4 illustrates various information flows in a preferred embodiment of the invention. The probabilistic PM model contains several sample points. Reference numeral 41 generally denotes a representative record in the data section of the probabilistic model PM. Reference numeral 411 denotes a sample point identifier, which is only needed for internal data processing operations. Reference numeral 412 denotes the coordinates (in some two or three-directional coordinate system) of the geographical location corresponding to the sample point. The z coordinate may be an actual third-dimension coordinate, or it may be interpreted as discrete floor or level information. Reference numeral $413_1$, through $413_n$ denote the signal value distributions of various base stations BS1 through BSn, along with the associated history and weights, as described earlier. An optional field 414 indicates the time of the last update of the sample point in question. For example, the contents of the time field 414 may reflect a probability-weighted average of time stamps 422 of the terminals' observations.

The measurement results of the various terminal devices are stored in a database DB. Reference numeral 42 generally denotes a representative information tuple that more or less corresponds to the observation set OS in FIG. 2. Field 421 is a device identifier and field 422 is a time stamp of the information tuple 42. The device identifier 421 may indicate the corresponding device directly, by means of some device type and serial number, or it may indicate the device indirectly, by means of a reference to a user/subscriber register (not shown separately). Fields 423 and 424 contain signal values that the terminal measured at the time indicated by the time stamp 422. More particularly, field 423 contains signal values that are needed for locating the terminal and field 424 contains the one or more additional measured fields. Depending on the chosen location-estimation algorithm, locating the terminal may comprise finding the sample point 41 that has the best correlation with the observed signal value distribution 423. Alternatively, the terminal's location may be estimated as a set of sample points (or locations in the network), along with the associated probabilities of those sample points. Fields 423 and 424 may contain signal values that are corrected by the terminal-specific device models, or they may contain raw measurement data, depending on the implementation. An optional field 425 contains the terminal location that corresponds to the terminal's observations (field 423) at the time indicated by the time stamp 422. A separate location field 425 is not absolutely necessary, since the terminal's location can be recalculated from the observations (field 423).

As shown by arrows 43*a* and 43*b*, the information tuples 42 are used to determine the additional measurement(s) 424 as a function of time and location in the area covered by the wireless network. By way of example, FIG. 4 shows such a function as a multi-page map 45 of one network parameter, such as apparent throughput. Each page of the map 45 corresponds to a specific instant of time. The time stamps 422 and location coordinates 425 (or 412) may not precisely coincide with those of the map 45, but the map can be determined from the measurement data 422, 425 (412) by interpolation. Arrow 43a from the probabilistic model PM to the time- and location-dependent function 45 is drawn with a dashed line. This is because the function 45 can be determined solely from the information tuples 42 if each information tuple 42 contains the terminal's location 425.

The time- and location-dependent function, such as the multi-page map 45 can be shown as a film to give administrators an overall view of network performance and bottlenecks at various times and locations. Or, the time- and location-dependent function can serve as a basis for more elaborate data processing and analysis.

In some embodiments of the invention, the additional item(s) may comprise signal values of base stations that are not at that time used to locate the terminal. Such measurements of additional base stations can be used to update the probabilistic model PM.

It is readily apparent to a person skilled in the art that, as technology advances, the inventive concept can be implemented in various ways. The invention and its embodiments are not limited to the examples described above but may vary within the scope of the claims.

I claim:

1. A method for locating several terminals in a wireless network comprising several base stations:
   the method comprising:
   maintaining a probabilistic model of the wireless network, the probabilistic model indicating a probability distribution for signal values of several base stations at several locations in the wireless network;
   for each of the several terminals:
   the terminal making a set of observations of signal values of a subset of said several base stations;
   determining an estimate of the terminal's location based on the probabilistic model and the set of observations;
   the terminal recurrently measuring at least one additional item, wherein the at least one additional item is not used for determining the estimate of the terminal's location;
   the method further comprising:
   collecting information tuples, wherein each information tuple indicates the at least one additional item and the time and the estimate of the terminal's location at which the at least one additional item was measured;
   storing and organizing the information tuples;
   using the stored information tuples to determine the at least one additional item as a function of time and location in the wireless networks,
   wherein the at least one additional item comprises throughput in the radio network and the step of measuring throughput comprises, in the following order:
   the terminal discontinuing making the set of observations;
   the terminal making a throughput measurement;
   the terminal continuing making the set of observations; and
   wherein, inversely weighting the throughput measurement by an estimated change of the terminal's location between the discontinuing and continuing steps.

2. A method according to claim 1, wherein the at least one additional item comprises a signal value of a base station that is not part of said subset.

3. A method according to claim 1, wherein the at least one additional item comprises a physical quantity unrelated to the radio network.

4. A method according to claim 1, wherein the at least one additional item comprises a quantity that cannot be measured without affecting the radio network's operation, and said measuring comprises controlling several terminals with a common controller.

5. A method according to claim 1, wherein the at least one additional item is measured in response to detecting a simultaneous need and opportunity to measure the at least one additional item.

6. A method according to claim 1, wherein the at least one additional item comprises identifiers of base stations.

7. A method according to claim 6, further comprising using the identifiers of base stations and the estimate of the terminal's location to detect an illegitimate base station.

8. A method according to claim 1, wherein the step of maintaining the probabilistic model of the wireless network comprises physically measuring signal values of several base stations at several locations in the wireless network.

9. A method according to claim 1, wherein the step of maintaining the probabilistic model of the wireless network comprises calculating signal values of several base stations at several locations based on a propagation model of the wireless network.

10. A method according to claim 1, further comprising:
    determining multiple device models that compensate for the differences between different terminals' observations of the at least one signal quality value; and
    for each terminal, selecting a device model among the multiple device models, and processing the observations made by the terminal with the selected device model.

11. An arrangement for locating several terminals in a wireless network comprising several base stations;
    the arrangement comprising:
    a probabilistic model of the wireless network, the probabilistic model indicating a probability distribution for signal values of several base stations at several locations in the wireless network;
    a location calculation module for determining an estimate of each terminal's location based on the probabilistic model and a set of observations made by the terminal in question, wherein the set of observations indicates signal values of a subset of said several base stations;
    control means for:

receiving from each of the several terminals at least one additional measured item, wherein the at least one additional item is not used for determining the estimate of the terminal's location;

storing information tuples, wherein each information tuple indicates the at least one additional item and the time and the estimate of the terminal's location at each the at least one additional item was measured; and for using the stored information tuples to determine the at least one additional item as a function of time and location in the wireless network, wherein the control means comprises a controller for coordinating measurements of several terminals, the at least one additional item comprises throughput in the radio network and the controller is operable to order a terminal to perform the following acts:

discontinue of making the set of observations;
perform a throughput measurement;
continue making the set of observations;
and the arrangement is operable to inversely weigh the throughput measurement by an estimated change of the terminal's location between the discontinuing and continuing acts.

12. An arrangement according to claim 11, wherein the at least one additional item comprises identifiers of base stations.

13. An arrangement for locating several terminals in a wireless network comprising several base stations;

the arrangement comprising:

a probabilistic model of the wireless network, the probabilistic model indicating a probability distribution for signal values of several base stations at several locations in the wireless network;

a location calculation module for determining an estimate of each terminal's location based on the probabilistic model and a set of observations made by the terminal in question, wherein the set of observations indicates signal values of a subset of said several base stations;

control means for:

receiving from each of the several terminals at least one additional measured item, wherein the at least one additional item is not used for determining the estimate of the terminal's location;

storing information tuples, wherein each information tuple indicates the at least one additional item and the time and the estimate of the terminal's location at each the at least one additional item was measured; and for using the stored information tuples to determine the at least one additional item as a function of time and location in the wireless network, wherein the arrangement further comprises multiple device models that compensate for the differences between different terminals' observations of the at least one signal quality value; and the arrangement is operable to select, for each terminal, a device model among the multiple device models, and to process the observations made by the terminal with the selected device model.

14. A computer program product embodying computer instructions, wherein executing the computer instructions in a computer arrangement functionally connected to a wireless network serving terminals causes the computer arrangement, the wireless network and the terminals to perform the steps of claim 1.

* * * * *